(12) United States Patent
Sasaki

(10) Patent No.: US 8,189,090 B2
(45) Date of Patent: May 29, 2012

(54) IMAGE PICK-UP APPARATUS AND CONTROL METHOD THEREFOR

(75) Inventor: Futoshi Sasaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 273 days.

(21) Appl. No.: 12/533,622

(22) Filed: Jul. 31, 2009

(65) Prior Publication Data
US 2010/0033593 A1  Feb. 11, 2010

(30) Foreign Application Priority Data

Aug. 6, 2008  (JP) ................................. 2008-203181

(51) Int. Cl.
H04N 5/232  (2006.01)
(52) U.S. Cl. ....................................................... 348/345
(58) Field of Classification Search .................... 348/345
See application file for complete search history.

(56) References Cited

U.S. PATENT DOCUMENTS

| 5,982,912 | A | 11/1999 | Fukui | |
|---|---|---|---|---|
| 6,816,611 | B1 | 11/2004 | Hagiwara et al. | |
| 7,298,412 | B2 | 11/2007 | Sannoh et al. | |
| 2004/0207743 | A1 | 10/2004 | Nozaki et al. | |
| 2005/0168621 | A1* | 8/2005 | Kageyama et al. | 348/349 |
| 2005/0226609 | A1* | 10/2005 | Suda | 396/114 |
| 2006/0127080 | A1* | 6/2006 | Mori et al. | 396/121 |
| 2008/0068487 | A1* | 3/2008 | Morita | 348/333.05 |
| 2009/0016708 | A1* | 1/2009 | Takeuchi | 396/104 |
| 2009/0028394 | A1* | 1/2009 | Hosoi et al. | 382/118 |
| 2009/0066815 | A1 | 3/2009 | Nozaki et al. | |
| 2010/0226636 | A1* | 9/2010 | Hirai et al. | 396/123 |
| 2011/0019184 | A1* | 1/2011 | Iwane | 356/123 |
| 2011/0038624 | A1* | 2/2011 | Muramatsu | 396/104 |
| 2011/0081141 | A1* | 4/2011 | Uenishi | 396/95 |

FOREIGN PATENT DOCUMENTS

| JP | 05-089244 A | 4/1993 |
|---|---|---|
| JP | 07-231733 A | 9/1995 |
| JP | 09-251534 A | 9/1997 |
| JP | 10-162118 A | 6/1998 |
| JP | 10-232934 A | 9/1998 |
| JP | 2000-048184 A | 2/2000 |
| JP | 3097250 B | 8/2000 |
| JP | 2003-107335 A | 4/2003 |
| JP | 2004-013871 A | 1/2004 |
| JP | 2004-317699 A | 11/2004 |
| JP | 2004-320286 A | 11/2004 |

* cited by examiner

Primary Examiner — James Hannett
(74) Attorney, Agent, or Firm — Cowan, Liebowitz & Latman, P.C.

(57) ABSTRACT

An image pick-up apparatus capable of displaying a detected subject region in a field of view of an optical finder intelligibly, and shortening a time until achieving a focus on a subject so as to decrease a release time lag. A focus detection unit detects data concerning a focus adjustment of a subject. An indication unit indicates a focusing point selected as a target of the focus adjustment among focusing points arranged at positions in a field of view of an optical finder according to the data detected by the focus detection unit. A subject detection unit detects a region of the subject using a signal that is different from the signal used for the detection in the focus detection unit. A control unit controls the indication unit based on the detection result of the subject detection unit so as to indicate the focusing points surrounding the region of the subject.

5 Claims, 11 Drawing Sheets

*FIG.10*

| POINT NUMBER | Offset | | Size | | POINT NUMBER | Offset | | Size | |
|---|---|---|---|---|---|---|---|---|---|
| | X | Y | W | H | | X | Y | W | H |
| 1 | 90 | 60 | 6 | 10 | 2 | 118 | 60 | 6 | 10 |
| ... | ... | 60 | 6 | 10 | ... | ... | 60 | 6 | 10 |
| 6 | 230 | 60 | 6 | 10 | 7 | 258 | 60 | 6 | 10 |
| 8 | 54 | 92 | 6 | 10 | 9 | 82 | 92 | 6 | 10 |
| ... | ... | 92 | 6 | 10 | ... | ... | 92 | 6 | 10 |
| 16 | 278 | 92 | 6 | 10 | 17 | 306 | 92 | 6 | 10 |
| 18 | 34 | 124 | 6 | 10 | 19 | 62 | 124 | 6 | 10 |
| ... | ... | 124 | 6 | 10 | ... | ... | 124 | 6 | 10 |
| 27 | 286 | 124 | 6 | 10 | 28 | 324 | 124 | 6 | 10 |
| 29 | 54 | 156 | 6 | 10 | 30 | 82 | 156 | 6 | 10 |
| ... | ... | 156 | 6 | 10 | ... | ... | 156 | 6 | 10 |
| 37 | 278 | 156 | 6 | 10 | 38 | 306 | 156 | 6 | 10 |
| 39 | 90 | 188 | 6 | 10 | 40 | 118 | 188 | 6 | 10 |
| ... | ... | 188 | 6 | 10 | ... | ... | 188 | 6 | 10 |
| 44 | 230 | 188 | 6 | 10 | 45 | 258 | 188 | 6 | 10 |

FIG.11

| FACE NUMBER | PRIORITY | Offset X | Offset Y | Width | Height |
|---|---|---|---|---|---|
| 1 | 2 | 72 | 79 | 62 | 68 |
| 2 | 1 | 150 | 79 | 62 | 68 |
| 3 | 3 | 226 | 79 | 62 | 68 |

…

IMAGE PICK-UP APPARATUS AND CONTROL METHOD THEREFOR

BACKGROUND OF THE INVENTION

1. Field of the Invention

The present invention relates to an image pick-up apparatus such as a digital camera or a surveillance camera having an autofocus (AF) function, and to a control method for the image pick-up apparatus.

2. Description of the Related Art

A focus detection device in early stages of an image pick-up apparatus, such as a camera, was provided with one focusing point at the center of a taking area. The number of focusing points increased gradually according to development of a focus detection device, it progressed to three points, seven points, nine points, nineteen points, and reached forty-five points, which has broadened a possible area for focus detection within the taking area.

Such an increase of the focusing points has the following advantages. That is, it can avoid so-called "out-of-focus in center" situation in which a camera focuses on a background and not on a subject in normal shooting. Further, it decreases a frequency of losing a subject from the focusing points when shooting a moving subject.

A multi-point AF (autofocus) system using a phase difference focuses on the subject located at the nearest position among a plurality of subjects that are coincident with the focusing points, in general. Accordingly, for example in person photography, when another body such as a flower or a ball is located at the nearest position, there is a problem that the camera focuses on the other body and not on the person.

Therefore, in recent years, AF systems using an eye control method and a subject (a face etc.) detection technique have been proposed, and such a system enables to take a picture that is well focused on a target.

For example, there is a technique to extract a face image from an inputted image using a face detection method of automatically detecting a face region by detecting characteristic parts of a face or skin color parts of a subject person in taken image data. Japanese laid-open patent publication (Kokai) No. 2004-13871 (JP2004-13871A) discloses a technique to register specific image data as an reference image, and to determine whether newly inputted image data agrees with the reference image.

Japanese laid-open patent publication (Kokai) No. 9-251534 (JP9-251534A) discloses a technique of specifying a region including a face by calculating a correlation value between face image data that has been registered beforehand and image data of a discrimination target. Japanese laid-open patent publication (Kokai) No. 10-162118 (JP10-162118A) discloses a technique of dividing image data into a plurality of regions by a frequency band, limiting regions that have high possibilities of existence of a face, and then calculating a correlation value between face image data that has been registered beforehand and image data in each of the limited regions.

Japanese laid-open patent publication (Kokai) No. 2003-107335 (JP2003-107335A) discloses an example in which these techniques are applied to a camera. In the example, a main subject is automatically detected from image data using a technique such as a shape analysis. Then, the camera indicates a focusing point on a monitor display so as to overlap the detected main subject, and executes a focus adjustment process on the indicated focusing point.

Japanese laid-open patent publication (Kokai) No. 2004-317699 (JP2004-317699A) discloses a technique to discriminate a region in which a face as a main subject exists by extracting characteristic points from image data, and to set a focus detection area according to the size of the discriminated region. Japanese laid-open patent publication (Kokai) No. 2004-320286 (JP2004-320286A) discloses a technique to discriminate a region in which a face as a main subject exists by extracting characteristic points from image data, and to drive a zoom mechanism according to the size of the discriminated region.

Japanese patent publication No. 3097250 (JP3097250B) discloses a technique to track a subject by a photometric/colorimetric device and to display a tracking result on a display device whose display area is divided into fifty-four regions. Since this display device is arranged between a focusing screen and a pentagonal prism, a user can observe a subject image on which the tracking result is superimposed, through an optical finder.

A compact-type digital camera, which does not have an optical finder and whose image sensor also acts as a focusing sensor, displays a detection result of a subject on a liquid crystal display monitor mounted on the camera back, and can adjust a focus by selecting a focusing point automatically or intentionally.

On the other hand, a single lens reflex digital camera is provided with an optical finder and a focusing sensor for the AF operation in addition to the image sensor. The focusing sensor is used to perform the AF operation when a main mirror, which is arranged inside the camera, is located in a taking optical path to guide a light to the optical finder. The image sensor is used to perform the AF operation when the main mirror goes out from the taking optical path.

In this case, if the face detection is tried to be performed using the image sensor, the image outputted from the image sensor is displayed on a liquid crystal display monitor in a so-called live view shooting mode, and then, the AF operation is performed using the image sensor on the face region detected from the image. Therefore, such an AF operation needs a longer time until the camera focuses on a subject as compared with the case where the AF operation is performed using the focusing sensor, which causes a problem of increasing a release time lag.

In the above-mentioned Japanese patent publication No. 3097250 (JP3097250B), the display area is divided into a plurality of regions, and an index that indicates a detection of the subject in a region near the detected subject is displayed. However, since only one index (frame) is illuminated in this technique, there is a problem in which it is unclear whether the subject is caught as a region.

SUMMARY OF THE INVENTION

The present invention provides an image pick-up apparatus and a control method therefor that are capable of displaying a detected subject region in a field of view of an optical finder intelligibly, and shortening a time until achieving a focus on a subject so as to decrease a release time lag.

Accordingly, a first aspect of the present invention provides an image pick-up apparatus comprising a focus detection unit adapted to detect data concerning a focus adjustment of a subject, an indication unit adapted to indicate a focusing point selected as a target of the focus adjustment among focusing points arranged at a plurality of positions in a field of view of an optical finder according to the data detected by the focus detection unit, a subject detection unit adapted to detect a region of the subject using a signal that is different from the signal used for the detection in the focus detection unit, and a control unit adapted to control the indication unit based on the detection result of the subject detection unit so that the plurality of focusing points surround the region of the subject.

Accordingly, a second aspect of the present invention provides a control method for an image pick-up apparatus comprising a focus detection step of detecting data concerning a focus adjustment of a subject, an indication step of indicating a focusing point selected as a target of the focus adjustment among focusing points arranged at a plurality of positions in a field of view of an optical finder according to the data detected in the focus detection step, a subject detection step of detecting a region of the subject using a signal that is different from the signal used for the detection in the focus detection step, and a control step of controlling the indication step based on the detection result in the subject detection step so that the plurality of focusing points surround the region of the subject.

According to the present invention, a subject region detected by the subject detection unit can be displayed in a field of view of an optical finder intelligibly, and a release time lag can be decreased by shortening a time until achieving a focus on a subject.

The features and advantages of the invention will become more apparent from the following detailed description taken in conjunction with the accompanying drawings.

BRIEF DESCRIPTION OF THE DRAWINGS

FIG. 10 is a table showing coordinate data of the respective focusing points in the viewing field frame of the optical finder shown in FIG. 3.

FIG. 11 is a table showing an example of face data acquired by a subject detection circuit of the camera shown in FIG. 1.

DESCRIPTION OF THE PREFERRED EMBODIMENTS

Hereafter, embodiments according to the present invention will be described in detail with reference to the drawings.

Figure 1:
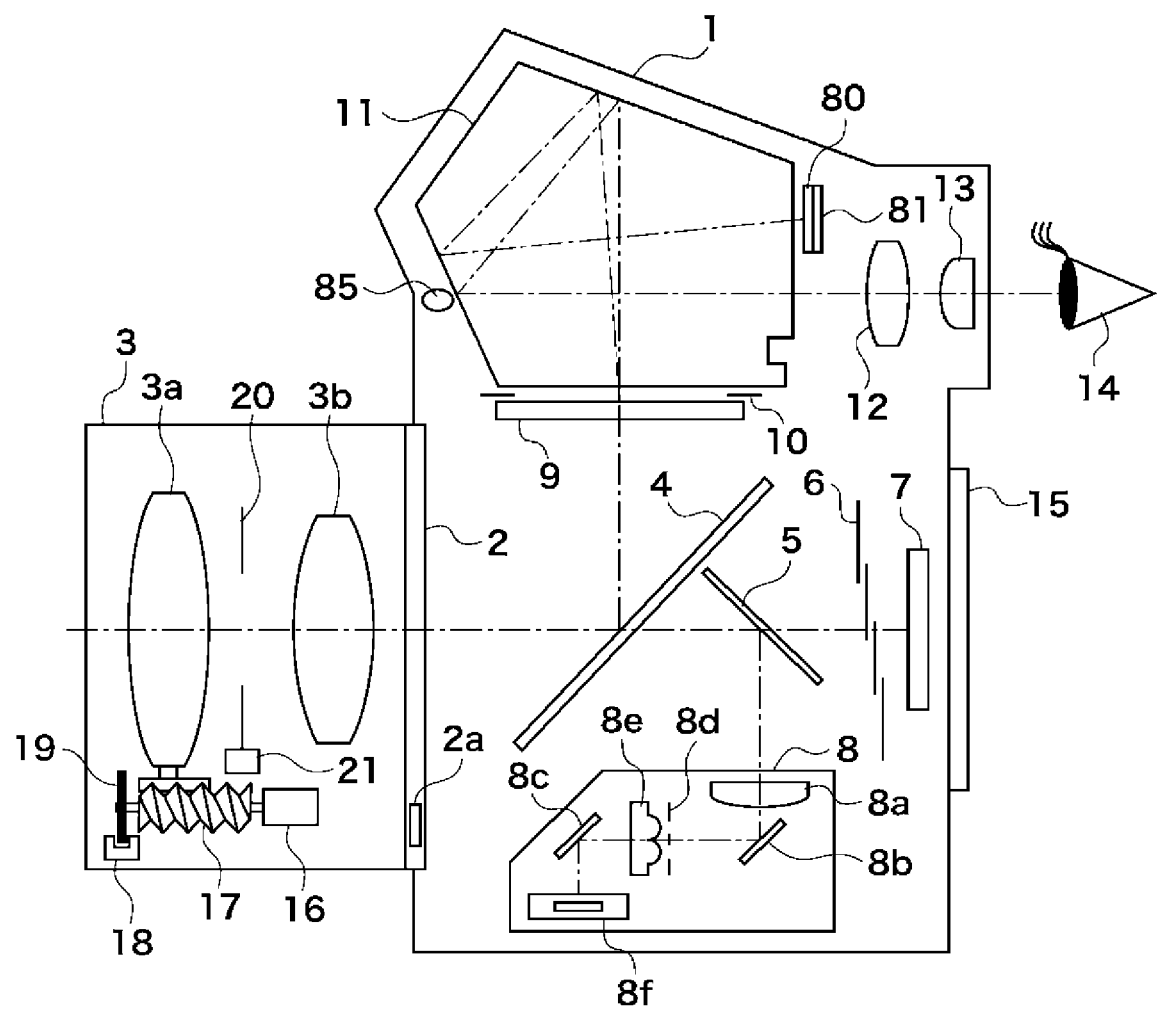
FIG. 1 is a schematic sectional view of a digital single lens reflex camera that is an example of an embodiment of an image pick-up apparatus of the present invention.

FIG. 1 is a schematic sectional view of a digital single lens reflex camera (referred to as "a camera", hereinafter) that is an example of an embodiment of an image pick-up apparatus of the present invention.

In the camera of the present embodiment, as shown in FIG. 1, a mount 2 of a camera body 1 is equipped with a removable taking lens 3, for example. The mount 2 has mount contacts 2a as an interface for communicating various signals and supplying driving electric power.

A main mirror 4 that is constituted by a half mirror is arranged in the camera body 1 so as to rotate according to an operating condition of the camera. The main mirror 4 is diagonally arranged in a taking optical path for bending a light flux from the taking lens 3 to be guided to an optical finder system (described later) when observing a subject through the optical finder. At a time of exposure, the main mirror 4 goes out from the taking optical path to guide the light flux from the taking lens 3 onto an image sensor 7.

A sub mirror 5 that rotates together with the main mirror 4 is arranged at the side of the image sensor 7 of the main mirror 4. The sub mirror 5 is constituted by a half mirror. The sub mirror 5 divides the light flux passing through the main mirror 4 into a light flux to be guided to a focus detection device 8 and a light flux to be guided to the image sensor 7 when the main mirror 4 is diagonally arranged in the taking optical path.

A shutter 6 is arranged between the sub mirror 5 and the image sensor 7. The focus detection device S that outputs a signal to determine a focusing condition is arranged under the sub mirror 5. A liquid crystal display monitor 15 that displays a taken image thereon is arranged on the back side of the camera body 1. It should be noted that a numeral 14 in FIG. 1 denotes a pupil of a user who observes a subject through the finder.

The focus detection device 8 is provided with a field lens 8a that is arranged near an image formation surface, reflection mirrors 8b and 8c, a secondary image formation lens 8e, an aperture stop 8d, an area sensor 8f that consists of a plurality of CCDs, etc. The focus detection device 8 can detect focusing conditions in forty-five regions, for example, of a subject using a well-known phase-difference detection method in the present embodiment.

The finder optical system, which consists of a focusing screen 9, a pentagonal prism 11, and eyepieces 12 and 13, is arranged above the main mirror 4.

The focusing screen 9 is arranged on a primary image formation surface of the taking lens 3. A Fresnel lens (condenser lens) is provided on the incident side surface of the focusing screen 9, and a subject image (a finder image) is formed on the exit side surface of the focusing screen 9. The pentagonal prism 11 corrects the subject image formed on the exit side surface of the focusing screen 9 to be an erect normal image. A finder viewing field frame 10, which forms a field of view of the optical finder, is arranged between the focusing screen 9 and the pentagonal prism 11.

A reflecting plate with which micro mirrors are formed is provided on the exit side surface of the focusing screen 9 for displaying focusing points (described later with reference to FIG. 3). When an LED 85 arranged at a side portion of the pentagonal prism 11 irradiates a light to a focusing point formed on the focusing screen 9, the focusing point is indicated by lighting. And looking into the eyepieces 12 and 13, a user can observe an optical image that is formed by superimposing the focusing point lighten by the light from the LED 85 on a subject image passing through the focusing screen 9.

A photometry sensor 80 and an image acquisition device 81 are arranged between the pentagonal prism 11 and the eyepiece 12. The photometry sensor 80 is a sensor for acquiring brightness data required for an exposure control, and the image acquisition device 81 is a device for acquiring an image at a time of mirror down.

The taking lens 3 has a focusing lens group 3a and a zooming lens group 3b. It should be noted that each of the lens groups 3a and 3b is illustrated as a single lens for convenience, but is constructed by a combination of complex lens groups including many lenses in fact.

The taking lens 3 has a focus driving motor 16 for driving the focusing lens group 3a, a focus driving member 17 that consists of drive gears etc., a photo coupler 18, a pulse plate 19 that links with the focus driving member 17, and an aperture stop 20. Further, the taking lens 3 has an aperture stop driving device 21 including an aperture stop driving circuit 62 (see FIG. 2).

Figure 2:
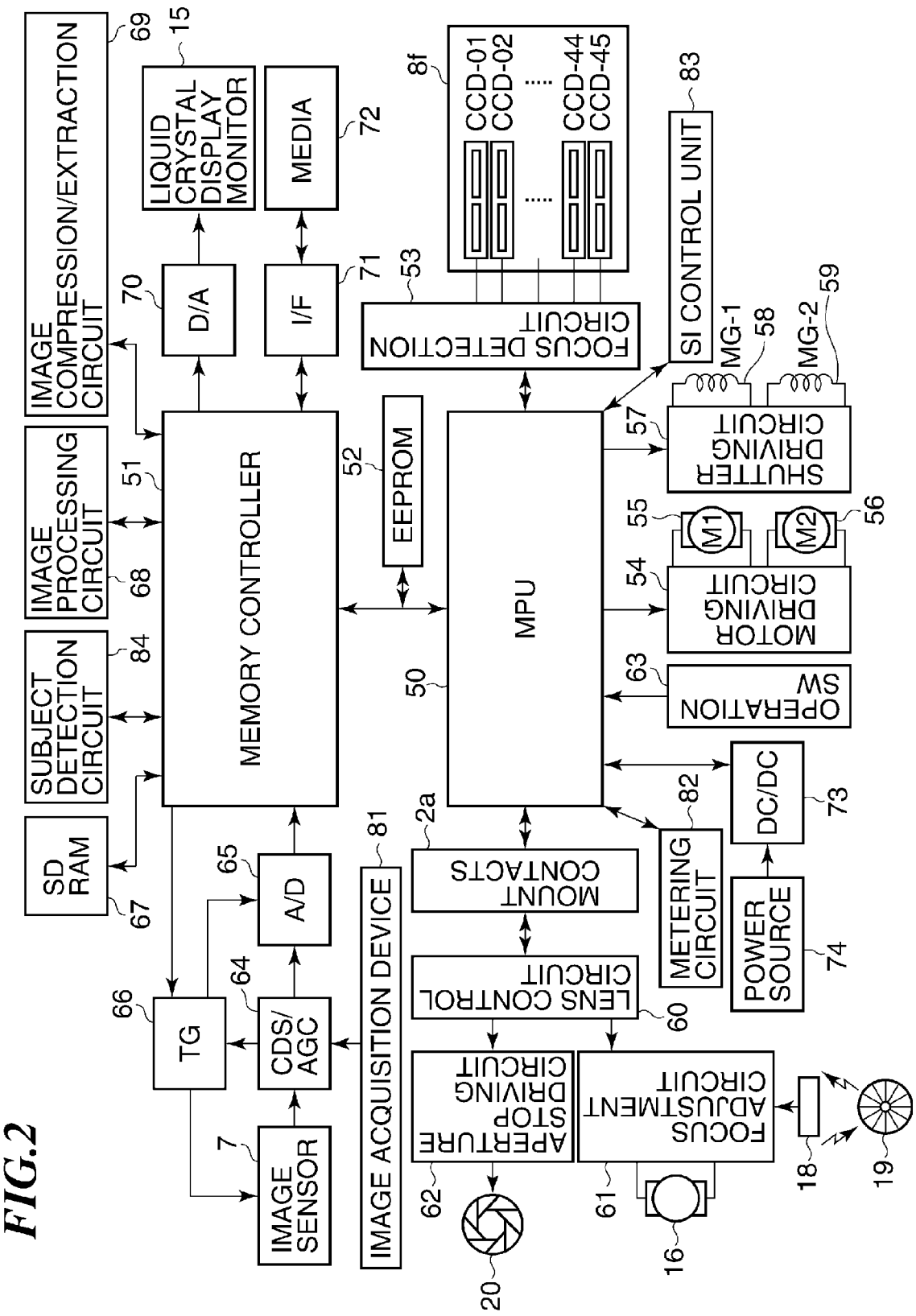
FIG. 2 is a block diagram for describing an electric configuration of the camera shown in FIG. 1.

FIG. 2 is a block diagram for describing an electric configuration of the camera according to the present embodiment.

In FIG. 2, an MPU 50 is a microcomputer (a central processing unit) that controls the entire system of the camera, and a memory controller 51 performs various controls of image data. An EEPROM 52 stores setup/adjustment data for performing various controls etc.

A focus detection circuit 53 is a circuit that determines a focusing condition. The focus detection circuit 53 performs an accumulation control and a reading control of the area sensor 8f according to the signal from the MPU 50, and outputs pixel data of each focusing point to the MPU 50. The area sensor 8f comprises forty-five sets of line sensors CCD-01 through CCD-45 corresponding to the plurality of focusing points in the viewing field frame 10 of the optical finder.

The MPU 50 detects a focusing condition based on pixel data of each focusing point using the well-known phase-difference detection method, and sends the detected focusing condition data to a lens control circuit 60 so as to adjust the focus of the lens. A series of operations from the focusing condition detection to the focus adjustment is called an autofocus (AF) operation.

A motor driving circuit 54 controls a motor 55 for driving the main mirror 4 and a motor 56 for charging the shutter 6 according to signals from the MPU 50. A shutter driving circuit 57 controls a magnet 58 for moving a first curtain of the shutter 6 and a magnet 59 for moving a second curtain of the shutter 6 so that the image sensor 7 is exposed to predetermined light amount according to signals from the MPU 50.

The lens control circuit 60 controls a focus adjustment circuit 61 and an aperture stop driving circuit 62 based on signals from the MPU 50 via the mount contacts 2a. The focus adjustment circuit 61 drives the focus driving motor 16 to move the focusing lens group 3a to a focus position based on rotation data of the pulse plate 19 detected by the photo coupler 18 and driving quantity data for the focusing lens group 3a from the lens control circuit 60.

The aperture stop driving circuit 62 drives the aperture stop 20 based on aperture data from the lens control circuit 60. An operation SW 63 is a switch for operating the camera and for setting various values for a shooting.

A CDS (correlation double sampling)/AGC (automatic gain control) circuit 64 is a circuit that performs a sample/hold operation and an automatic gain control operation to the image signal outputted from the image sensor 7. An A/D converter 65 converts the analog output of the CDS/AGC circuit 64 into a digital signal.

A TG (timing generation) circuit 66 supplies a driving signal to the image sensor 7, supplies a sample/hold signal to the CDS/AGC circuit 64, and supplies a sample clock signal to the A/D converter 65.

Here, the memory controller 51 receives the image signal outputted from the image sensor 7 through the CDS/AGC circuit 64 and the A/D converter 65, and can detect a focusing condition of a subject image using a contrast detection method.

An SDRAM 67 temporarily records an image etc. that are converted into the digital signal by the A/D converter 65. An image processing circuit 68 applies processes of Y/C (luminance-signal/color-difference signal) separation, white balance correction, gamma correction, etc. to an image. An image compression/extraction circuit 69 performs a process to compress an image according to a format, such as JPEG, and performs a process to extract compressed image.

A subject detection circuit 84 detects a subject, such as a human face, from the image signal acquired from the image acquisition device 81 or the image sensor 7, and generates data including a position, a probability, etc. of a subject.

AD/A converter 70 converts the image data recorded on the SDRAM 67 or a medium 72 into an analog signal, in order to display the image on the liquid crystal display monitor 15. An I/F 71 is an interface between the memory controller 51 and the medium 72 that records and saves the image data. A DC/DC converter 73 changes voltage of a power source 74 into voltage required for each circuit.

Figure 3:
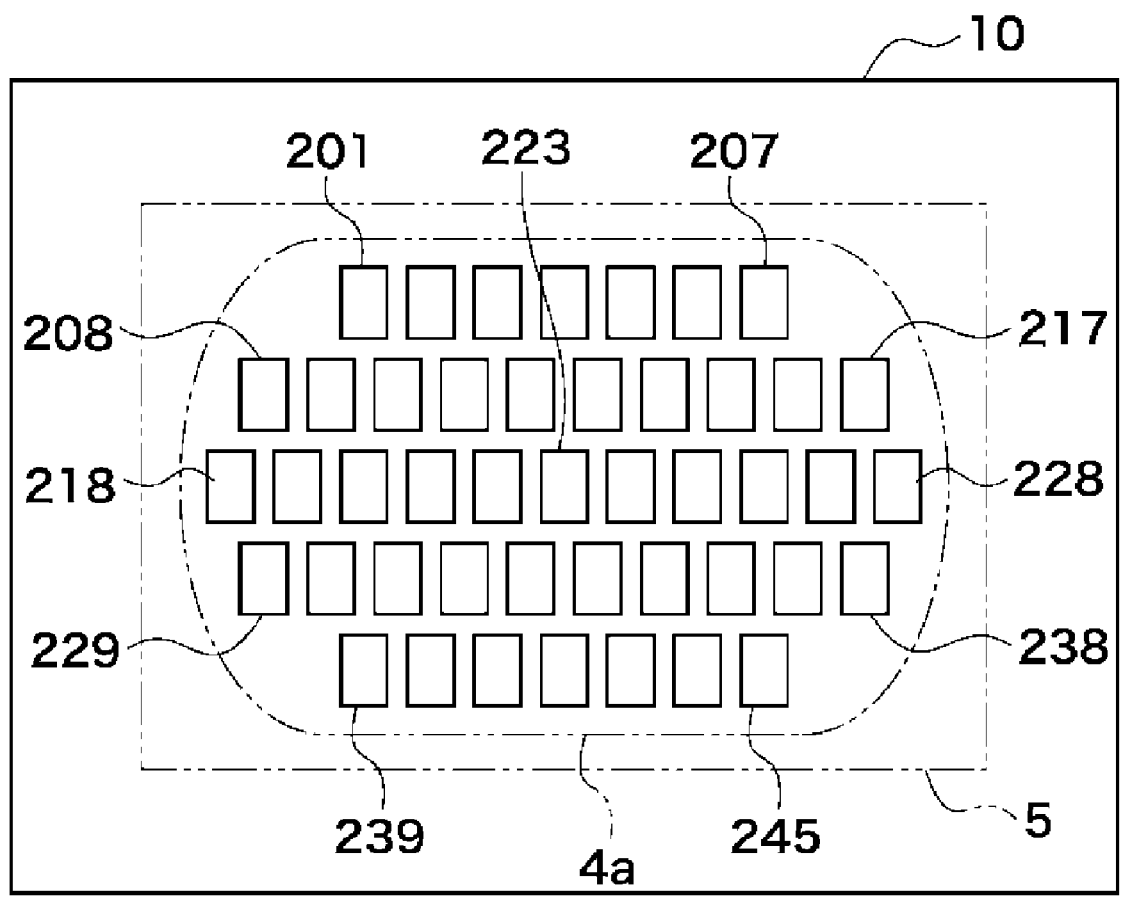
FIG. 3 is a view showing a condition of indicating all focusing points in an SI (a superimposition) indication within a viewing field frame of an optical finder of the camera shown in FIG. 1.

An SI (superimposition) control unit 83 controls lighting of the LED 85 with the assistance of the MPU 50, and performs an SI indication of all the focusing points 201 through 245 in the viewing field frame 10 of the optical finder shown in FIG. 3.

In FIG. 3, the main mirror 4 has a mask 4a that separates the light flux reached the main mirror 4. The mask 4a allows the light flux needed for the AF operations in the plurality of focusing points 201 through 245 to pass and reflects unnecessary light flux to supply light quantity for the optical finder.

The light flux passing through the mask 4a is partially reflected by the sub mirror 5 that is slightly larger in size than the mask 4a. The light flux reflected by the sub mirror 5 is guided to the focus detection device 8. The light passing through the sub mirror 5 is guided to the image sensor 7.

Here, since the size of the finder viewing field frame 10 is equivalent to the size of a light receiving surface of the image sensor 7, the same picture (an area of the field of view) as the image acquired by the image sensor 7 can be observed through the finder (100% of finder coverage)

Therefore, although FIG. 3 shows the field of view of the finder, it also shows the sizes of the mask 4a of the main mirror 4 and the sub mirror 5 with respect to the image sensor 7. That is, the light flux included within the region of the mask 4a on the image sensor 7 reaches the image sensor 7 by passing through the main mirror 4 and the sub mirror 5.

Next, an example of an SI indication process in the camera of the embodiment will be described with reference to FIGS. 4 through 11. It should be noted that each process in FIG. 4 and FIG. 5 is realized by loading a program stored in the ROM or the like onto the RAM and by executing the program by the MPU 50.

Here, in the following description, it is assumed that the main mirror 4 is arranged in the taking optical path so that the subject light reflected by the main mirror 4 is incident on the photometry sensor 80, the image acquisition device 81, and the eyepiece 12 via the focusing screen 9 and the pentagonal prism 11.

Figure 4:
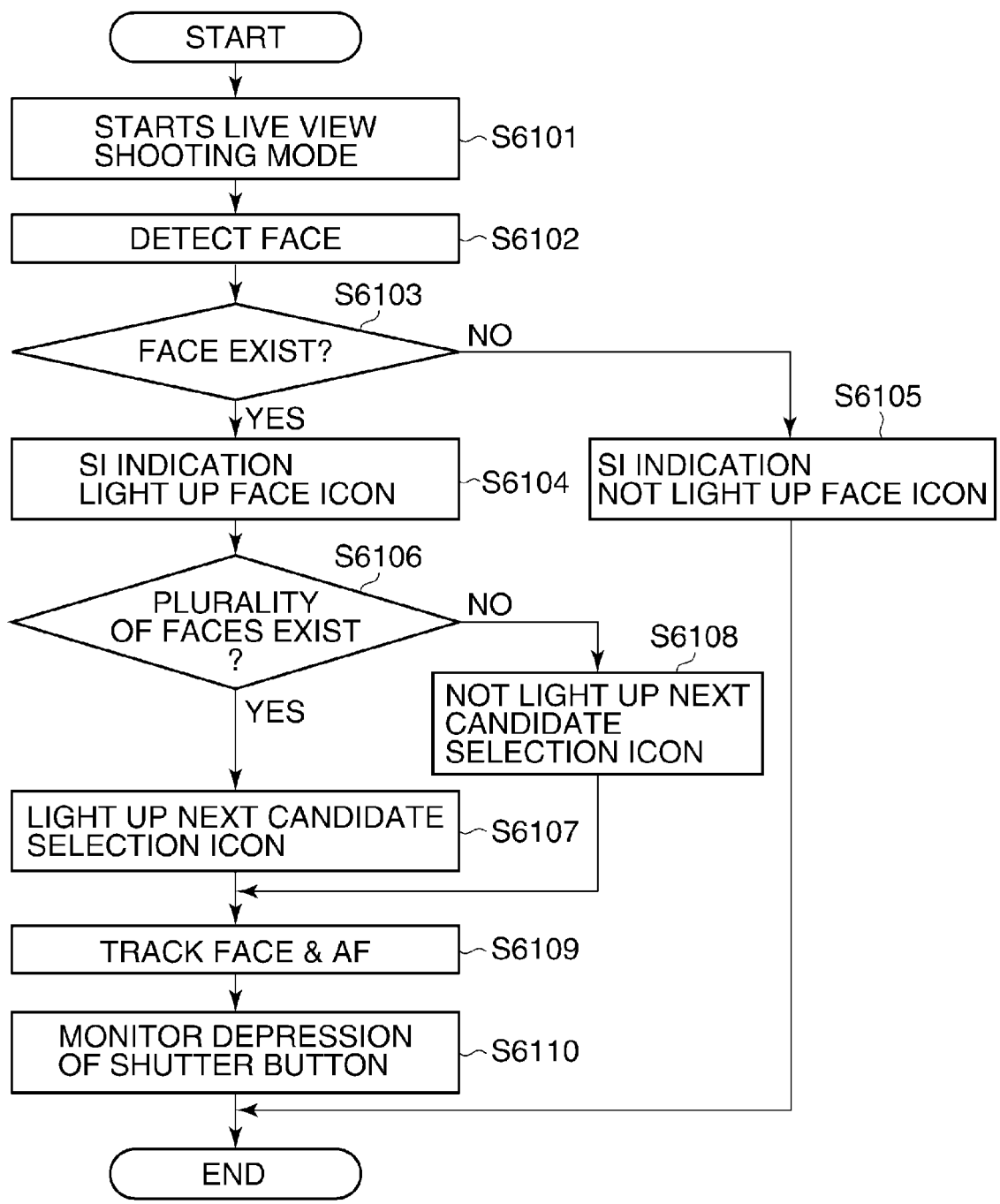
FIG. 4 is a flowchart for describing an example of an SI indication process in the camera shown in FIG. 1.
Figure 5:
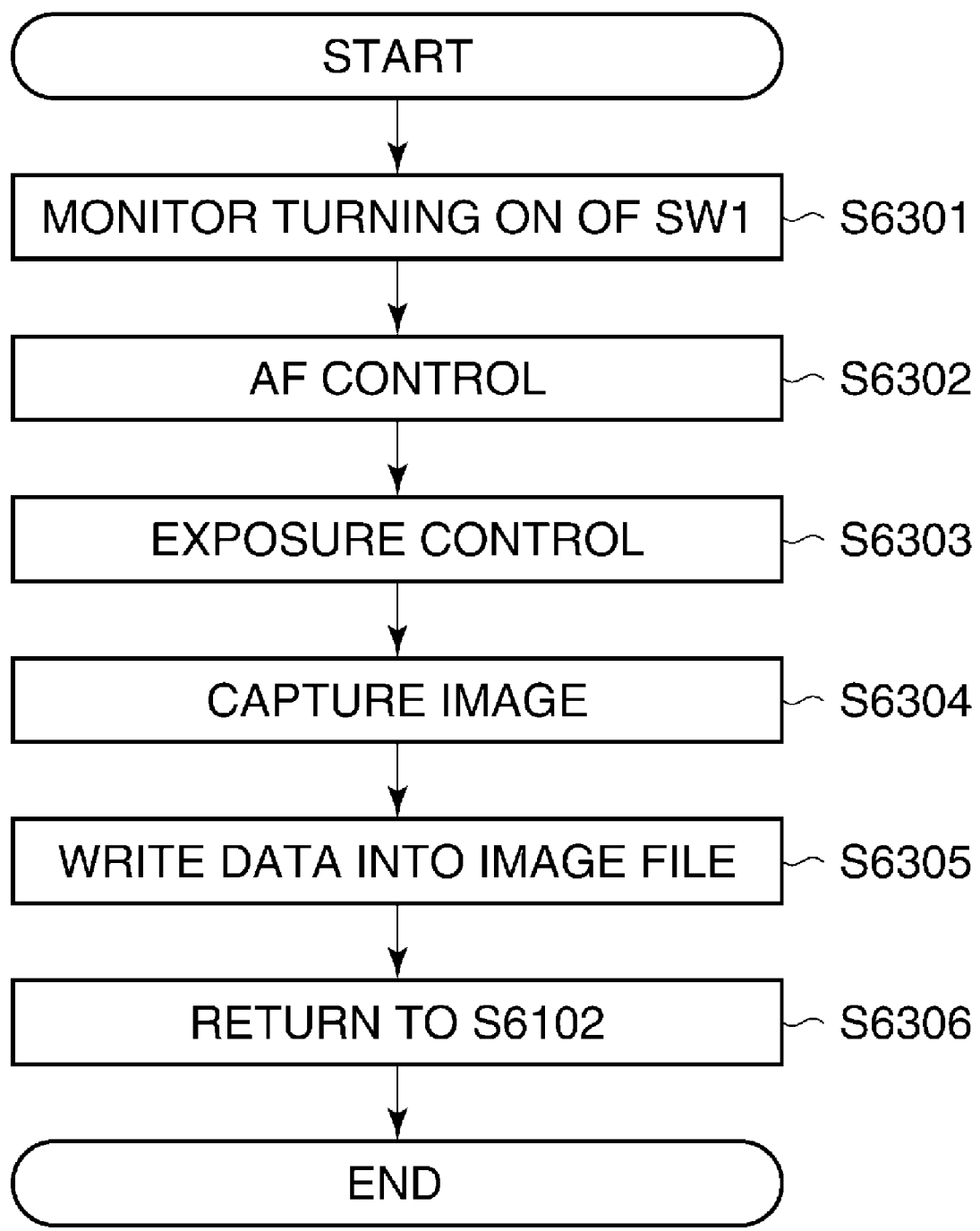
FIG. 5 is a flowchart for describing a process after a depression of a shutter button in the camera shown in FIG. 1.

In FIG. 4, in step S6101, the MPU 50 starts a live view shooting mode, controls the motor driving circuit 54 to move the main mirror 4 to the taking optical path, and proceeds with the process to step S6102.

It should be noted that the similar process may be performed in step S6101 when an event of some kind is received, for example, when a special button for instructing a start of face detection is operated.

In step S6102, the MPU 50 detects a subject (face) from the image data generated from the output of the image acquisition device 81, which can acquire an image under the mirror-down condition, by using the subject detection circuit 84, and proceeds with the process to step S6103.

Here, various techniques for detecting a subject from image data are publicly known. For example, there is a method to use a learning realized by a neural network. There is a method of discriminating characteristic parts of physical shape, such as eyes, a nose, a mouth, and a face outline, based on image data using template matching.

Alternatively, there is a method to detect characteristic quantity, such as a skin color and an eye shape, in image data and to use a statistical analysis (see Japanese laid-open patent publication (Kokai) No. 10-232934 (JP10-232934A), Japanese laid-open patent publication (Kokai) No. 2000-48184 (JP2000-48184A), etc.).

Furthermore, there is a method to determine whether a detected region is close to a face region that was detected in just previous detection, to determine a color near a face region to add a color of clothing to consideration, or to lower a threshold value for a face discrimination as approaching a center of an image. There is a method to specify a region including a main subject and memorize histogram and color information in the region beforehand, and to track the main subject by calculating a correlation value.

The present embodiment, which may employ any of the above-mentioned methods, performs a face region discrimination process by a method to detect face outlines and to determine a human face region based on relative positions thereof.

Although the present embodiment detects a human face, a target other than a human face (for example, an animal, a player's uniform number, a specific car) can be also detected.

For example, Japanese laid-open patent publication (Kokai) No. 5-89244 (JP5-89244A) suggests a method of recognizing characters of a license plate in the image data taken by a camera. There is also a method of memorizing a uniform number of a sport player, for example, as a characteristic value beforehand and searching a taken still image for a region that is coincident with the above-mentioned characteristic value.

Japanese laid-open patent publication (Kokai) No. 07-231733 (JP07-231733A) suggests a method of recognizing species of a fish on the basis of entire length and body height of the fish using image data acquired by shooting the fish. This technique is also applicable to detection of an animal.

In step S6103, the MPU 50 determines whether a face has been detected in step S6102. If a face has been detected, the process proceeds to step S6104. If a face has not been detected, the process proceeds to step S6105.

Figure 6A:
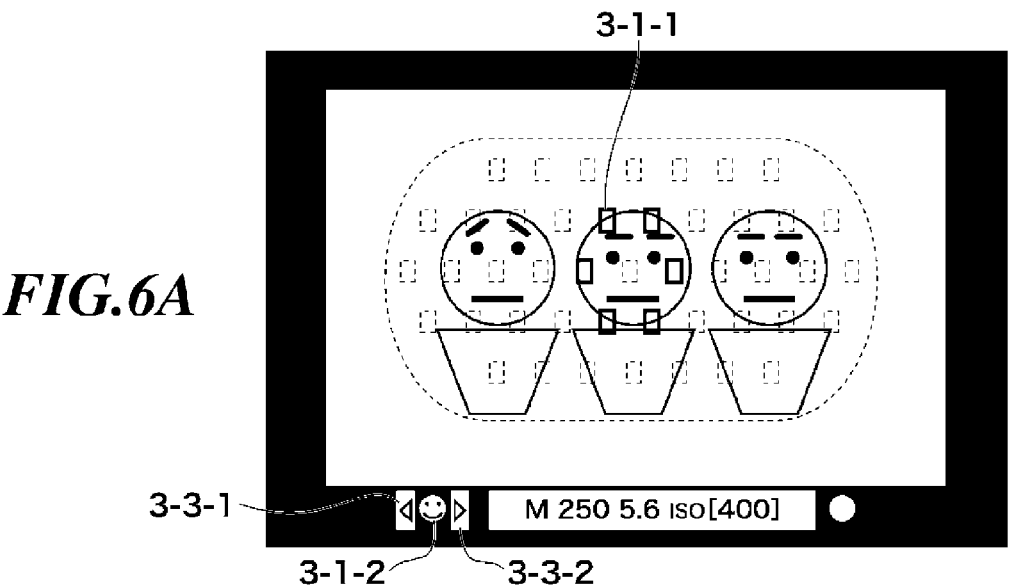
FIGS. 6A, 6B, and 6C are views showing SI indication examples in the viewing field frame of the optical finder of the camera shown in FIG. 1 when a plurality of faces have been detected.

FIG. 11 shows examples of the face detection results for the image data shown in FIG. 6A. The table of FIG. 11 shows that the faces indicated by the face numbers 1, 2, and 3 of three persons have been detected at the respective coordinates represented by (Offset X, Offset Y) with the respective sizes represented by (Width, Height) in the coordinate system whose origin is the lower left corner of the finder viewing field frame. These examples show the detection results in the element size of 360*240 pixels. However, if the coordinate data is enough to be reflected to the SI indication on the optical finder, the element size and the unit of the coordinate data are not limited in particular. In this example, the priority "1" is given to the face at the center of the field of view indicated by the face number 2 among the three faces aligned side by side in the viewing field frame as shown in FIG. 6A. The priority "2" is given to the left face and the priority "3" is given to the right face. The smaller the numeric value of the priority is, the larger the weight as a target of the AF operation is given. That is, the AF operation is executed so as to obtain the best focus on the face of which the priority is "1".

The MPU 50 selects the focusing points that surround the face of which the priority is "1" based on the face detection result as shown in FIG. 11 and SI indication position data shown in FIG. 10. It should be noted that FIG. 10 is a table showing coordinate data of the respective focusing points 201 through 245 in the viewing field frame of the optical finder shown in FIG. 3. In FIG. 10, the point number represents the number of each of the focusing points 201 through 245, the Offset (X, Y) represents the center coordinate of each of the focusing points in the coordinate system whose origin is the lower left corner of the finder viewing field frame, and the Size (W, H) represents the size of each of the focusing points in the horizontal and vertical directions.

In step S6104, the MPU 50 controls the SI control unit 83 to light up the selected focusing points 3-1-1 that surround the face at the center position in FIG. 6A (corresponding to the priority "1" in FIG. 11) and to light up a face icon 3-1-2.

Specifically, the focusing points that are determined to be located on the detected face outline are used. When there is no focusing point on the face outline, the focusing points located immediately outside the outline are used. If the SI indication is performed using the focusing point located at the center of the detected face or all the focusing points overlapped to the detected face, the detected face becomes difficult to see and the facial expressions become difficult to observe.

Thus, in the present embodiment, the SI indication is performed using the focusing points positioned on the outline of the detected face or outside the face. This allows a user to recognize the position and size of the selected face region under the condition where the facial expressions of the detected face can be recognized.

Figure 9A:
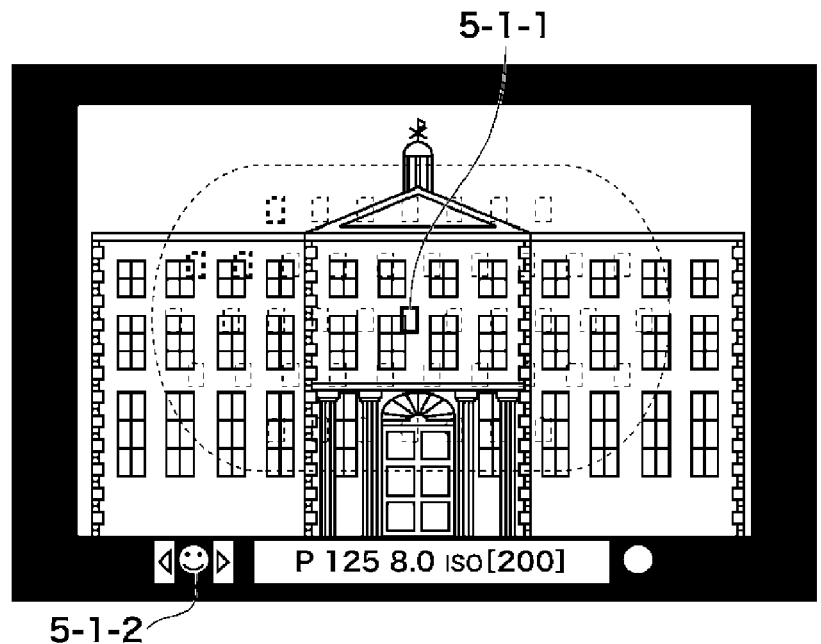
FIGS. 9A and 9B are views showing SI indication examples in the viewing field frame of the optical finder of the camera shown in FIG. 1 when no face has been detected.
Figure 9B:
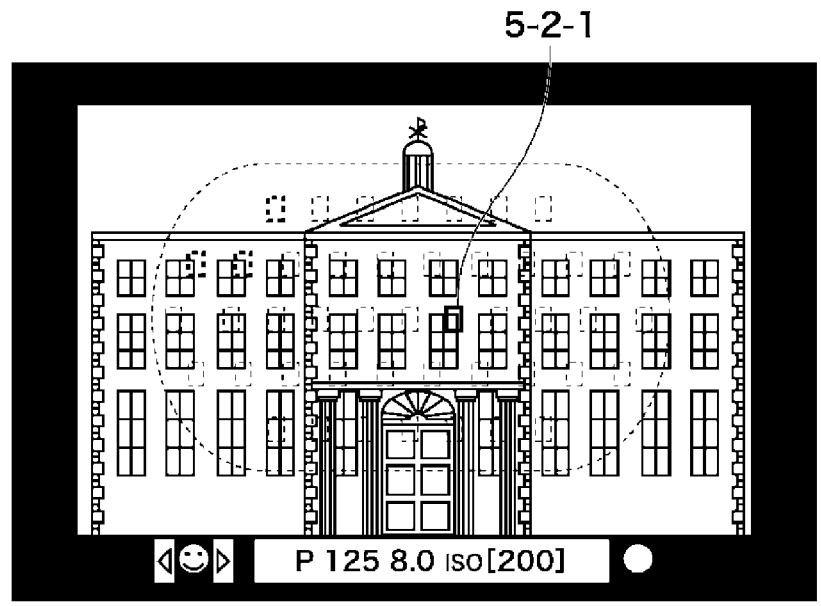

On the other hand, when no face has been detected, in step S6105, the MPU 50 performs the SI indication to display the focusing point 5-1-1 on the optical finder as shown in FIG. 9A, which is similar to the prior art, and not to light up the face icon 5-1-2 according to the current AF mode and the condition of the subject. Here, for example, if a next right candidate button is pressed, the MPU 50 lights up the focusing point 5-2-1 on the right side of the focusing point 5-1-1 instead of the focusing point 5-1-1, as shown in FIG. 9B.

Next, in step S6106, the MPU 50 determines whether there are a plurality of faces. If there are a plurality of faces, the process proceeds to step S6107. If there are not a plurality of faces, that is, there is a face of one person, the process proceeds to step S6108.

In step S6107, the MPU 50 lights up a next right candidate selection icon 3-3-2 as shown in FIG. 6A when there is a face in the right side of the position of the currently selected face. The MPU 50 lights up a next left candidate selection icon 3-3-1 as shown in FIGS. 6A and 6B when there is a face in the left side of the position of the currently selected face.

Figure 6B:
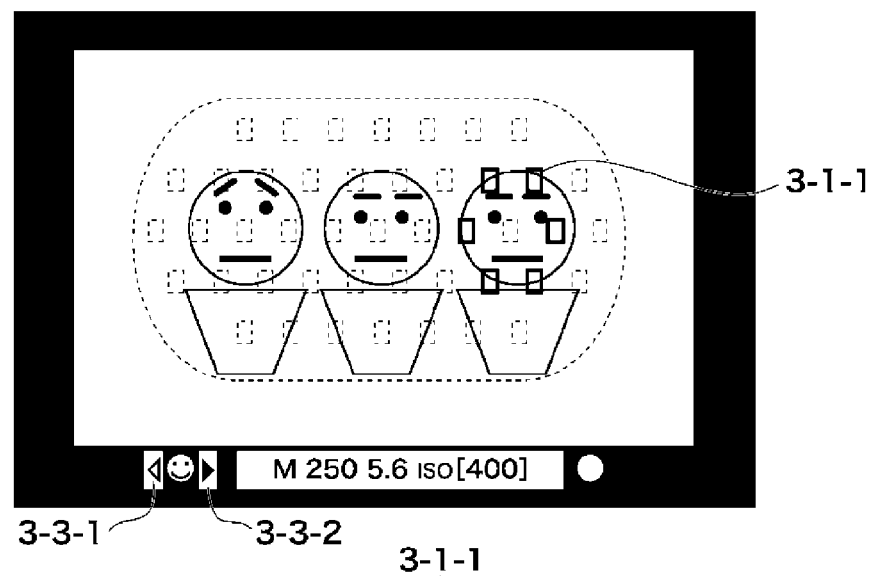

For example, if the SI indication is performed to all the three faces shown in FIG. 6B by the method shown in FIG. 6A, nearly half of the focusing points in the screen light up similarly, and it becomes difficult to determine where a face region was detected.

Therefore, in the present embodiment, as shown in FIGS. 6A and 6B, the SI indication that shows the position of the detected face is not performed to any faces other than the face selected as the main face.

However, the SI indication to the selected main face alone cannot make a user recognize whether there is a face other than the face selected as the main face.

Therefore, the present embodiment lights up the next candidate selection icons (images for operation) 3-3-1 and 3-3-2 as described above when a face is detected besides the face selected as the main face. This configuration notifies a user whether a face is detected besides the face selected as the main face, and which side the detected face is positioned with respect to the selected main face.

Figure 6C:
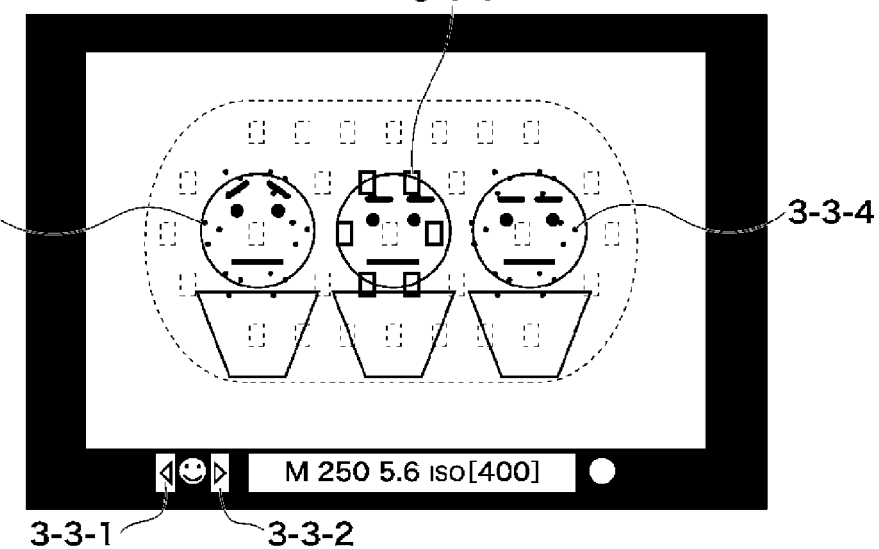

It should be noted that an indication, which is different from the indication of focusing points 3-1-1 showing the position of the selected main face, may be displayed modestly in order to facilitate the discrimination of the position and size of the selected main face. For example, dot groups 3-3-3 and 3-3-4 may be displayed for showing modestly positions and sizes of faces other than the selected main face as shown in FIG. 6C. It may be set beforehand whether these dot groups 3-3-3 and 3-3-4 are displayed or not.

Figure 8:
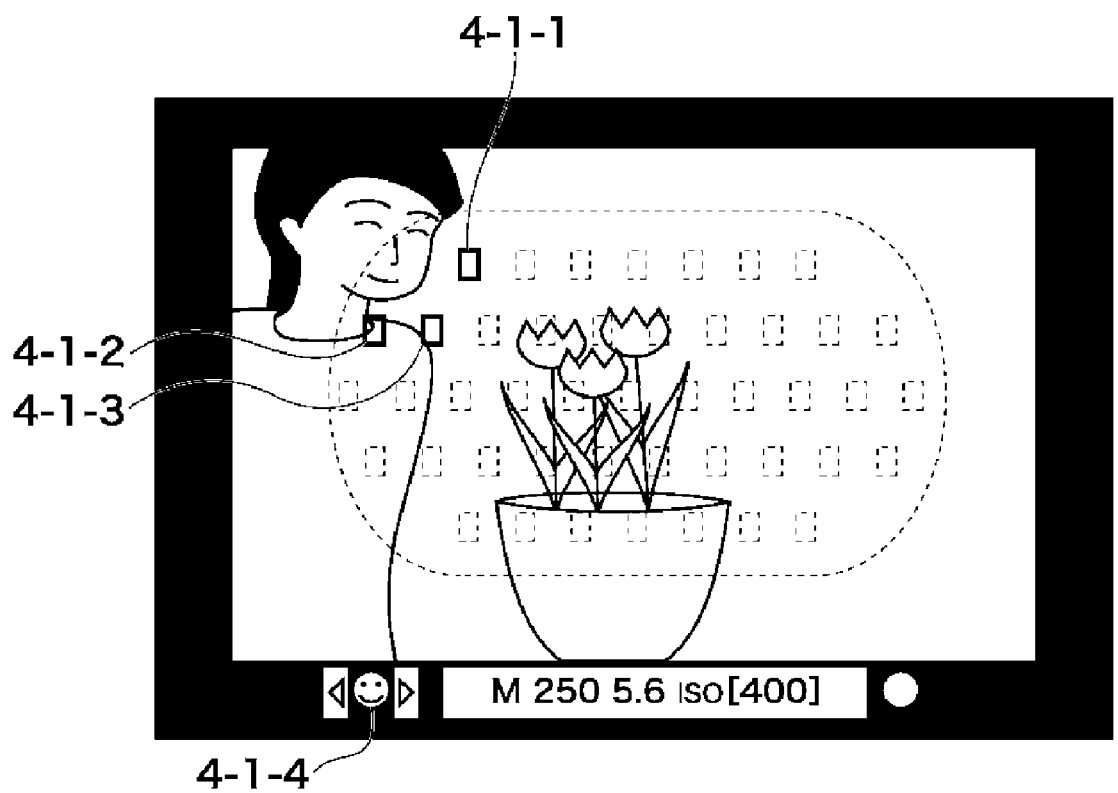
FIG. 8 is a view showing an SI indication example in the viewing field frame of the optical finder of the camera shown in FIG. 1 when a face has been detected outside the focusing points.

A face is not necessarily detected in a position that can be surrounded by the focusing points. Accordingly, when the detected face is located outside an indication area of the plurality of focusing points, the focusing points 4-1-1, 4-1-2, and 4-1-3 nearest to the outline of the detected face light up along the periphery of the face region to indicate the face position as shown in FIG. 8.

While lighting the next candidate selection icons 3-3-1 and 3-3-2, an operation of an unillustrated next candidate selection key is acceptable. The next candidate selection key has an operation member such as a button or a dial to select right or left.

And if a direction toward a candidate position that is shown by the next candidate selection icon is coincident with a direction that is instructed by the operation member, the MPU 50 controls to change the SI indication to the face of the next candidate located in that direction.

Figure 7A:
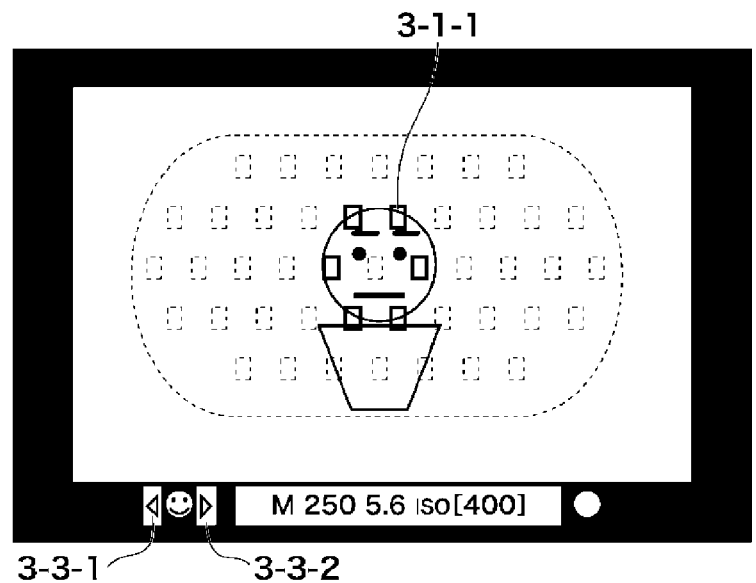
FIGS. 7A and 7B are views showing SI indication examples in the viewing field frame of the optical finder of the camera shown in FIG. 1 when one face has been detected.

When there is only one face, the MPU 50 does not light up the next candidate selection icons 3-3-1 and 3-3-2 in step S6108 as shown in FIG. 7, and proceeds with the process to step S6109.

In step S6109, the MPU 50 performs the AF operation to the currently selected face. It should be noted that a process when a face moves may be selected among the process to perform the AF operation to the region where the face has been detected beforehand and the process to track the selected face, according to the AF mode.

In step S6110, the MPU 50 shifts the process to a module that monitors a depression of a shutter button, and finishes the process.

FIG. 5 is a flowchart for describing a process after a depression of the shutter button.

In step S6301, the MPU 50 monitors whether the shutter button is half pressed (i.e., whether an AF switch SW1 turns on). If the AF switch SW1 turns on, the process proceeds to step S6302.

Figure 7B:
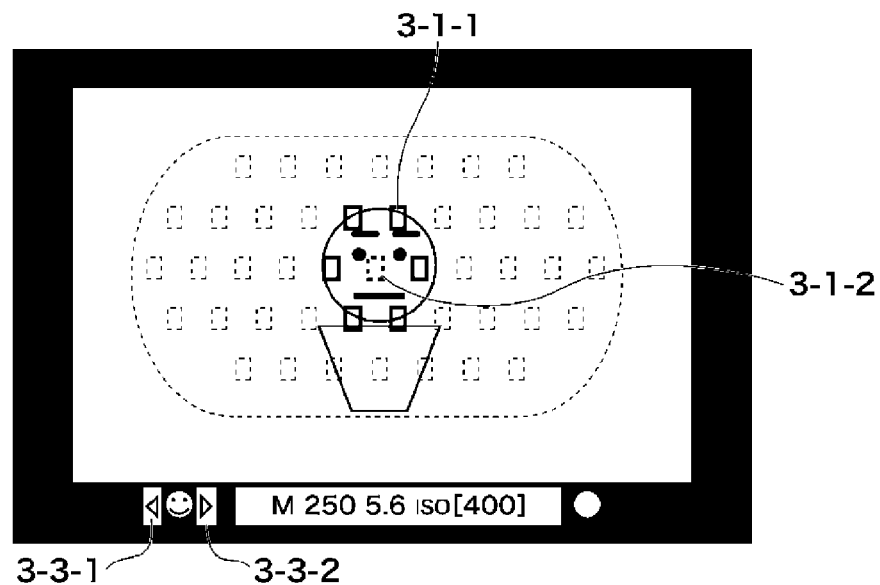

In step S6302, the MPU 50 performs a final AF control to the currently selected face, and fixes a focal position. And the MPU 50 performs the SI indication, which is different in pattern from the SI indication of the focusing points 3-1-1 to indicate the face position, to the focusing point 3-1-2 located at the center of the face so as to inform of the in-focus condition as shown in FIG. 7B. For example, the focusing point 3-1-2 is changed in color or is blinked. Alternatively, the in-focus condition may be indicated by changing a color of the SI indication or blinking while using the focusing points 3-1-1 used to indicate the face position.

Then, the MPU 50 calculates an exposure value so as to obtain an appropriate brightness of the selected face according to a currently selected exposure mode and conditions in step S6303, and waits until the shutter button is fully pressed to turn on a release switch SW2. If the release switch SW2 turns on, the MPU 50 captures an image by driving the shutter 6 and the CDS/AGC circuit 64 in step S6304 according to the calculated exposure value, writes the captured image data into an image file in step S6305, and returns the process to step S6102.

As described above, in the present embodiment, the subject detection circuit 84 detects a face from the image data generated from the output of the image acquisition device 81, which can acquire an image under the mirror-down condition, but not from the output of the image sensor 7. And the plurality of focusing points are indicated by lighting so as to surround the detected face region in the field of view of the optical finder.

Accordingly, since the detected face region can be displayed intelligibly, and a release time lag can be decreased by shortening a time until achieving a focus on a subject. As a result, the AF function using the subject detection technique according to the present embodiment enables a good shot to a subject.

Since one operation of the operation member moves the plurality of focusing points toward the subject of the next candidate to surround the region of the subject concerned, a user can quickly achieve proper focus onto an intended subject.

While the present invention has been described with reference to exemplary embodiments and it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2008-203181, filed on Aug. 6, 2008, and which is hereby incorporated by reference herein in its entirety.

What is claimed is:

1. An image pick-up apparatus comprising:
    a focus detection unit adapted to detect data concerning a focus adjustment of a subject;
    an indication unit adapted to indicate a focusing point selected as a target of the focus adjustment among focusing points arranged at a plurality of positions in a field of view of an optical finder according to the data detected by said focus detection unit;
    a subject detection unit adapted to detect a region of the subject using a signal that is different from the signal used for the detection in said focus detection unit; and
    a control unit adapted to select the plurality of focusing points surrounding the region of the subject based on the detection result of said subject detection unit and to control said indication unit to indicate the plurality of focusing points selected by said control unit.

2. The image pick-up apparatus according to claim 1, wherein said control unit indicates an image for operation used to select a candidate subject next to the currently selected subject in the field of view of the optical finder when said subject detection unit detects a plurality of subjects.

3. The image pick-up apparatus according to claim 1, wherein said control unit controls said indication unit to indicate focusing points surrounding another subject region in different indication pattern from the indication of the plurality of focusing points surrounding the currently selected subject region when said subject detection unit detects a plurality of subjects.

4. The image pick-up apparatus according to claim 1, wherein said control unit controls said indication unit to indicate focusing points nearest to the subject so as to be arranged along the periphery of the subject region when the subject detected by said subject detection unit is located outside an indication area of the plurality of focusing points in the field of view of the optical finder.

5. A control method for an image pick-up apparatus comprising:
   a focus detection step of detecting data concerning a focus adjustment of a subject;
   an indication step of indicating a focusing point selected as a target of the focus adjustment among focusing points arranged at a plurality of positions in a field of view of an optical finder according to the data detected in said focus detection step;
   a subject detection step of detecting a region of the subject using a signal that is different from the signal used for the detection in said focus detection step; and
   a control step of selecting the plurality of focusing points surrounding the region of the subject based on the detection result of said subject detection unit and controlling said indication step to indicate the plurality of focusing points selected by said control unit.

* * * * *